3,437,671
METHOD OF MAKING POLYESTERS BY THE REACTION OF ANHYDRIDE ACID HALIDE WITH POLYOLS AND RESULTANT ADHESIVE COMPOSITIONS
Stanley Robert Sandler, Springfield, and Florence Ray Berg, Philadelphia, Pa., assignors to The Borden Company, New York, N.Y., a corporation of New Jersey
No Drawing. Filed June 10, 1966, Ser. No. 556,542
Int. Cl. C08g 17/08; C09j 3/16
U.S. Cl. 260—346.3      3 Claims

ABSTRACT OF THE DISCLOSURE

This invention relates to the method of preparing polyesters having terminal aromatic anhydride groups by reacting aromatic anhydride acid halides with polyols under substantially anhydrous conditions and at a temperature below about 15° C.

---

The reaction of aromatic anhydrides, as for example, trimellitic anhydride acid halides, is known with esterifying compounds such as hydroxy group containing compounds. The known reactions, however, takes place across the anhydride ring thereby destroying any usefulness which may result from a compound having anhydride moieties therein. It has now been found that such esterified compounds having terminal anhydride groups are useful as adhesives and also for further reaction with epoxy moiety containing compounds to form additional adhesive compositions having superior T-peel properties and good adhesive properties in the cryogenic temperature range. These anhydrides react to provide flexible epoxy materials.

Briefly stated, the present invention comprises a process for making said polyester wherein an aromatic anhydride acid halide is reacted with a polyol at reduced temperatures, i.e., about 15° C. and below; polyesters prepared by said process, and; an adhesive composition wherein an epoxy group containing compound is reacted with said polyester. Additional curing agents may be added to the epoxy adhesive or may be reacted thereinto for activation at higher temperatures.

The invention will be herein described in connection with the reaction of trimellitic anhydride acid chloride with polyoxypropylene glycol of varying molecular weight. The polyester of the invention is the reaction product of approximately 2 moles of an aromatic anhydride acid halide, and 1 mole of a polyoxyalkylene polyol or polyoxy aralkylene polyol. When preparing the adhesive of this invention it is preferred that there be a repeating ether group in the polyol. The polyester may be represented by the following general structural formula:

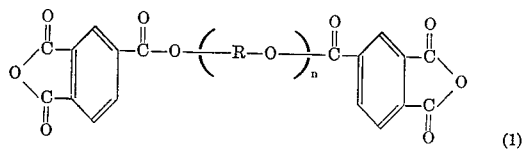

(1)

wherein R is a hydrocarbon moiety selected from the group consisting of alkyl and arylkyl groups and $n$ is an integer being at least 2 and up to 100 and greater. Reaction of the polyester anhydride with material containing epoxy moieties in the presence of epoxy curing agents or catalysts are believed to occur across the anhydride ring.

It has been found that polymers of greater plasticity are produced when ether linkages are present between the anhydride groups. Proportionately it has been found that decreasing the number of repeating ether groups results in a more brittle polymer, and ether groups in greater proportion in the polymer enhances the desired properties of the adhesive composition as is shown in Table II.

As to the process for making the polyester it has been found that a reduced reaction temperature is highly desirable for conserving the anhydride moieties in the polyester product. Generally, the aromatic anhydride acid halide is dissolved in a suitable organic solvent under anhydrous conditions and cooled as for example, about 0° C. The polyol and an acid acceptor, such as for example, a tertiary amine, are slowly added to the anhydride solution while maintaining the temperature in the range, preferably below about 15° C. It is advantageous to stir the reaction system. After the polyol and acid acceptor have been added to the solution, the temperature is permitted to rise to about room temperature and the solids (the salt resulting from the esterification reaction) may be removed by any convenient method. The solvent is removed by any conventional means as for example, distillation.

Reaction temperatures above 15° C. tend to reduce the yield of the anhydride polyester and favor reaction across the anhydride moiety. Conversely, reduction of the reaction temperature favors anhydride polyester yield. It must be recognized however, that the kinetics of the esterification reaction are slowed with decreasing temperature and at extremely low temperatures, as for example −100° C., the reaction rate is very slow, and is hardly discernable.

The resultant anhydride polyester may then be reacted with compounds containing epoxy moieties and further treated with co-curing agents for said epoxy. Curing of the epoxidized product is preferably accomplished at elevated termperatures. When used as an adhesive the last-mentioned reaction product has exceptional T-peel properties at room temperature and good adhesive properties at low temperature and also within the cryogenic temperature range, namely in the range of down to about −320° F. and below.

As to the materials for preparing the polyester, the aromatic anhydride acid halide is preferably trimellitic anhydride acid chloride. The polyol has at least 2 and up to about 5 hydroxy groups therein and is an alkyl or arylalkyl compound having preferably the repeating unit $C_2$–$C_{12}$ oxy, and in the case where the unit is arylalkyl, there are a minimum of 7 carbon atoms per repeating oxy unit. The molecular weight of the polyol varies with the number of carbon atoms in the oxy unit and is dependent upon the number of such repeating units. Generally, the repeating unit is an integer in the range 2–100. Examples of the polyols, the polyoxyalkylene polyols, and the polyoxyaralkylene polyols include: polyoxypropylene glycol, polyoxybutylene glycol, polyoxyphenylene glycol, neopentyl glycol, tetraethylene glycol, polyethylene glycol, polyisoproplyene glycol, ethylene glycol, polyoxydodecylene glycol, gylcerol, pentaerthritol and the like. Substituted polyols such as amino alcohols and similar polyamines may be used to advantage.

The solvent for the polyester reaction is a solvent for the reactants and the product and includes aliphatic ketones, ethers and amides as for example: acetone, methylethyl ketone, tetrahydrofuran, dimethylformamide and dimethyl acetamide, and the like.

The acid acceptor is preferably a tertiary amine as for example, triethyl amine, however other bases could be used, such as pyridine, alkali metal hydroxides and inorganic carbonates such as sodium carbonate or bicarbonate.

As to the compounds containing epoxy moieties, compounds having diglycidyl groups give generally good results. Particularly preferred are polyglycidyl aromatic compounds, for example diglycidyl bisphenols and glycidyl esters of aromatic polycarboxylic acids, the latter being the esterification product of aromatic polycarboxylic acids and glycidyl alcohols. Specific examples of these compounds include: diglycidyl ether of bisphenol A and substituted bisphenol A compound, diglycidyl phthalate, diglycidyl isophthalate and diglycidyl terephthalate.

The additional curing agent for epoxy compounds may be any of those known in the art as for example, acids, anhydrides, amines, tertiary amines, polyamino resins and acids. Examples of these classes of curing agents include benzyl dimethylamine, phenyl diethylamine, methylaniline, phthalic acid, boron trifluoride etherate, boron trifluorideamine complexes cyclopentene tetracarboxylic acid and its dianhydride, and the like.

As to proportions, approximate stoichiometric molar quantities of anhydride acid halide to polyol are used to advantage. Specifically, the ratio of 1 acid halide moiety for each hydroxy unit of the polyol are considered 1:1 molar ratios. Suitable results are obtained, however, using molar ratios in the range of about .2–3 hydroxy groups in the polyol for each acid halide moiety of the anhydride compound. The acid acceptor is used in proportion of at least the molar quantity of acid halide required to be taken up and preferably in excess thereof.

The proportion of epoxy compound reacted with the polyester is up to about 2 and generally in the range of 1–2 moles of glycidyl groups for each anhydride group of the polyester. In terms of weight proportion, it has been found that up to 500 parts by weight of epoxy compound can be added to 100 parts by weight of the polyester. The weight proportion of additional curing agent which may be added is usually less than 100 and preferably in the range 0–5 parts for up to 500 parts by weight of epoxy compound. Unlimited quantities of epoxy compounds could be added, however, reaction between the epoxy moiety and the anhydride moiety is obviously limited by the number of anhydride groups available. Excessive epoxy results in a decrease in the desired adhesive properties of the product.

The proportions set forth in the following table are intended to more clearly illustrate the invention and are not to be interpreted as a limitation thereon. The columns show "Illustrative" proportions outside of which range, the desired adhesive properties are reduced and the column "Recommended" shows examples within the optimum range of proportion of this invention for the best results.

TABLE I

| | Moles for 100 moles of anhydride acid halide | |
| --- | --- | --- |
| | Illustrative | Recommended |
| Anhydride acid halide (as acid halide) | 100 | 100 |
| Polyol (as dihydroxy) | 10–150 | 40–60 |
| Acid acceptor | 100–300 | 100–150 |

It is to be noted that the wide range of proportions for the epoxy compound and curing agent is due to the considerable latitude in the repeating ether structure of the polyester. Where a high molecular weight polyester is used, i.e., where the ratio of terminal anhydride groups to repeating ether groups of the polyester is low, the proportion of epoxy compound is lower (depending upon its structure) than where the number of repeating units is reduced relative to the number of anhydride groups.

In the examples that follow and elsewhere herein, proportions are expressed as parts by weight unless specifically stated otherwise.

Preparation of Trimellitic Anhydride Adduct of Polyoxypropylene Glycol

Example 1

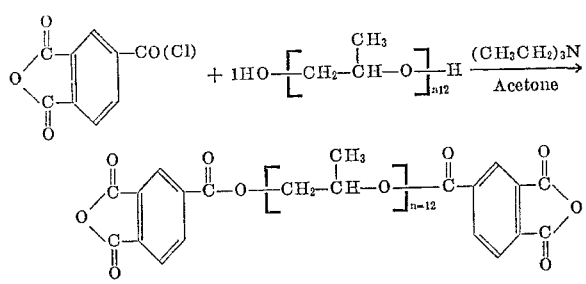

Into a resin kettle was placed 42.1 gms. (.2 mole) of trimellitic anhydride acid chloride and 350 gms. of acetone. The flask was cooled to 0° C. and a solution of 75.6 gms. (.1 mole) of polyoxypropylene glycol (M.W. about 700) and 20.2 mgs. (.2 mole) of triethylamine was added dropwise over a 2 hour period while the temperature was kept in the range of 0–5° C. After the addition was completed stirring was continued for 2 hours while the reaction mixture reached room temperature. The reaction mixture was filtered, and the solids rinsed with 50 ml. acetone. The combined acetone filtrate and washings were concentrated under vacuum to yield 94.5 gm. (85%).

Analytically calculated: C, 61.1%; H, 7.5%. Found: C, 61.6%; H, 8.1%.

11 gms. of the polyester were mixed with 3.4 gms. of diglycidyl ether of bisphenol A in the presence of .06 ml. of benzyl dimethylamine. The mixture was heated at 100° C. for 2 hours after which time there resulted a clear, flexible plastic having good strength properties.

Examples 2–6

(2) 11.0 parts of polyester dianhydride of polyoxypropylene glycol of mol. wt. 756 and said acid chloride. 3.4 parts of diglycidylether of bisphenol. .06 part of benzyldimethylamine.

(3) 3.9 parts polyester of of dianhydride of polyoxypropylene glycol of mol. wt. 426 and said acid chloride. 1.7 parts of diglycidyl ether of bisphenol. .03 part of benzyldimethyl-amine.

(4) 3.9 parts polyester dianhydride of polyoxypropylene glycol of mol. wt. 426 and said acid chloride. 1.4 parts of diglycidyl isophthalate. .03 part of benzyldimethylamine.

(5) 4.8 parts of dianhydride of dipropylene glycol and said acid chloride. 3.4 parts of diglycidyl ether of bisphenol A. .06 part benzyldimethylamine.

(6) 4 parts polyester dianhydride of polyoxybutylene glycol of mol. wt. 1000 and said acid chloride. 6 parts epoxy resin. 1 part aniline-formaldehyde resin.

Example 7

The composition of Examples 2–6 were compared for T-peel and tensile strength with the epoxy adhesives described below, but which form no part of this invention:

Epoxy 1.—26 parts epoxidized diphenyl ether modified novolac resin. .5 part 4,4'-methylene dianiline.
Epoxy 2.—2.4 parts diglycidyl ether of bisphenol A. .5 part 4,4'-methylene dianiline.

TABLE II

| Example | "n" units | T-peel [1] | Tensile shear strength (p.s.i.) [2] | | |
|---|---|---|---|---|---|
| | | | −320° F. | 73 F. | 400° F. |
| 2 | 13 | 2.8 | 6,220 | ----- | 150 |
| 3 | 7.3 | 6 | 3,430 | 3,130 | 183 |
| 4 | 7.3 | 1.8 | 4,520 | 2,900 | 183 |
| 5 | 2 | 1 | 1,160 | 1,370 | 303 |
| 6 | 14 | 12 | ----- | 1,003 | ----- |
| Epoxy 1 | | 1 | 1,780 | 2,290 | 170 |
| Epoxy 2 | | 0 | 3,630 | 2,170 | 1,754 |

[1] The T-peel strength was determined using the Tinius Olsen Electromatic Universal Testing Machine. T-peel strength is defined as the force in pounds per inch, to delaminate or peel back a 2 ply test specimen on aluminum at 73° F.

[2] The tensile shear strength was determined using a Tinius Olsen Electromatic Universal Testing Machine. Tensile shear strength is defined as the force, in pounds per square inch, to shear the bonded test specimen (aluminum) in tension.

It will be understood that it is intended to cover all changes and modifications of the examples of the invention herein chosen for the purpose of illustration which do not constitute departures from the spirit and scope of the invention.

We claim:

1. The process of making a polyester having terminal aromatic anhydride groups comprising the step of:
   (1) reacting a haloformyl phthalic anhydride with a polyol under substantially anhydrous conditions and at temperatures below about 15° C., there being from about 10 to about 150 moles of polyol on the basis of dihydroxy polyol for each 100 moles of haloformyl groups in said haloformyl phthalic anhydride.

2. The process of making a polyester having terminal aromatic anhydride groups comprising the steps of:
   (1) admixing a haloformyl phthalic anhydride with an organic solvent for the reactants described and for the final polyester;
   (2) cooling said admixture to a temperature below about 15° C.; and,
   (3) slowly admixing therewith and maintaining the temperature below about 15° C. an admixture of (a) polyol selected from the group consisting of $C_2$–$C_{12}$ alkylene and aralkylene polyols with, (b) acid acceptor, there being from about 10 to about 150 moles of polyol on the basis of dihydroxy polyol for each 100 moles of haloformyl groups in said haloformyl phthalic anhydride.

3. The process of claim 2 wherein said haloformyl phthalic anhydride is trimellitic anhydride acid chloride and said polyol is polyoxypropylene glycol.

References Cited

UNITED STATES PATENTS 3,182,073   5/1965   Loncrini _____ 260—78

SAMUEL H. BLECH, *Primary Examiner.*

PAUL LIEBERMAN, *Assistant Examiner.*

U.S. Cl. X.R.

260—78, 835, 834